United States Patent [19]
Rock et al.

[11] Patent Number: 6,156,406
[45] Date of Patent: Dec. 5, 2000

[54] THREE-DIMENSIONAL HIGH-LOW BULK SPACER FABRIC

[75] Inventors: Moshe Rock, Andover, Mass.; Karl Lohmueller, Hampstead, N.H.

[73] Assignee: Malden Mills Industries, Inc., Lawrence, Mass.

[21] Appl. No.: 09/044,623

[22] Filed: Mar. 19, 1998

[51] Int. Cl.[7] .................................................. B32B 3/02
[52] U.S. Cl. ................................................... 428/86
[58] Field of Search ........................................ 428/86

[56] References Cited

U.S. PATENT DOCUMENTS

| | | | |
|---|---|---|---|
| 4,785,558 | 11/1988 | Shiomura | 36/114 |
| 4,787,219 | 11/1988 | Sato et al. | 66/190 |
| 4,914,836 | 4/1990 | Horovitz | 36/28 |
| 5,385,036 | 1/1995 | Spillan et al. | 66/87 |
| 5,413,837 | 5/1995 | Rock et al. | 428/192 |
| 5,514,428 | 5/1996 | Kunert | 428/34 |
| 5,547,733 | 8/1996 | Rock et al. | . |
| 5,582,893 | 12/1996 | Bottger et al. | 428/86 |
| 5,589,245 | 12/1996 | Roell | 428/85 |
| 5,651,847 | 7/1997 | Loeffler | . |
| 5,720,047 | 2/1998 | Spitzer | 2/161.1 |
| 5,783,277 | 7/1998 | Rock et al. | 428/86 |
| 5,817,391 | 10/1998 | Rock et al. | 428/86 |
| 5,896,758 | 4/1999 | Rock et al. | 66/191 |

*Primary Examiner*—Terrel Morris
*Assistant Examiner*—Arti R. Singh
*Attorney, Agent, or Firm*—Gottlieb Rackman & Reisman

[57] ABSTRACT

A three-dimensional knit spacer fabric is provided. The fabric includes a first fabric layer, a second fabric layer and yarns interconnecting the two layers. A portion of the yarns interconnecting the two layers is perpendicular to each of the first and second fabric layers, while the remaining interconnecting yarns will be disposed at an angle between the two layers.

9 Claims, 2 Drawing Sheets

THREE-DIMENSIONAL HIGH-LOW BULK SPACER FABRIC

BACKGROUND OF THE INVENTION

This invention relates to a three-dimensional knit or woven fabric for footwear, and more particularly, to a three-dimensional high-low bulk spacer fabric.

Prior art footwear fabrics are generally comprised of a non-integrated fabric with a laminate applied thereto. It is often desirable for the footwear fabric to have different heights, i.e., a thinner fabric along the front or toe portion of the footwear item, and a thicker, more supportive fabric along the rear or heal portion. In the prior art, this is achieved by using multiple fabric inserts, each having different heights. This is obviously disadvantageous in terms of assembly and construction of the footwear item, as well as, in terms of inventory requirements and capital assets needed for the required assembly.

Accordingly, it is desirable to provide a fabric which overcomes the above disadvantages.

SUMMARY OF THE INVENTION

Generally speaking, in accordance with the invention, a composite three-dimensional knit spacer fabric is provided. The fabric includes a first fabric layer, a second fabric layer and yarns interconnecting the two layers. A portion of the yarns interconnecting the two layers is perpendicular to each of the first and second fabric layers, while the remaining interconnecting yarns will be disposed at varying angles between the two layers, with the result that the former will be of lesser and the latter of greater bulk.

After the fabric of the invention is assembled properly inside the desired footwear item, a pressurized air source is applied to the fabric between the two layers in order to substantially expand the portion of fabric with the angled interconnecting yarns until these yarns are also disposed perpendicularly with respect to the two layers. As a result, a fabric insert for footwear is provided having sections with different fabric thickness where desired in order to create different levels of bulk across the width of the fabric.

Accordingly, it is an object of the invention to provide an improved knit fabric construction.

Another object of the invention is to provide an improved three-dimensional knit fabric having different levels of bulk across the width thereof.

A further object of the invention is to provide a three-dimensional knit fabric in which at least some of the interconnecting yarns are knit at an angle with respect to the two layers thereof.

Still other objects and advantages of the invention will in part be obvious, and will in part be apparent from the following description.

The invention accordingly comprises the construction having the features, properties and relation of components, as exemplified in the following detailed disclosure, and the scope of the invention will be indicated in the claims.

BRIEF DESCRIPTION OF THE DRAWINGS

For a fuller understanding of the invention, reference is made to the following description, taken in connection with the attached drawings, in which.

DETAILED DESCRIPTION OF THE PREFERRED EMBODIMENT

Figure 1:
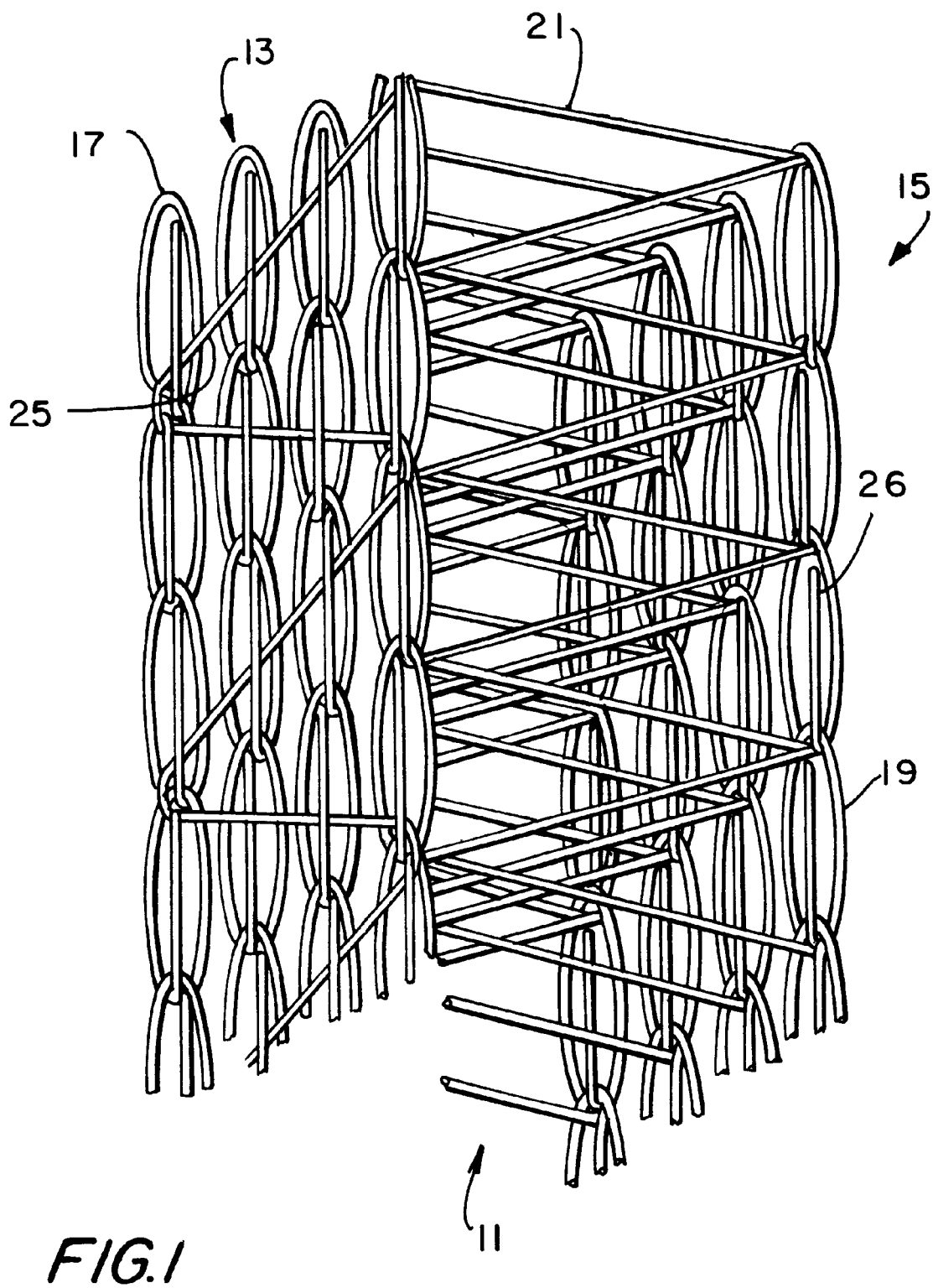
FIG. 1 is a side elevational view showing the loop structure of the spacer fabric.

The double-face fabric of the invention is prepared by knitting a three-dimensional knit fabric on a double-needle bar warp knitting machine commonly used in the manufacture of velvet and well known in the art. As shown in FIG. 1, the three-dimensional knit spacer fabric is generally indicated at 11 and includes a first fabric layer 13 made from stitch yarn 17, a second fabric layer 15 made from stitch yarn 19, and pile yarn 21 interconnecting the two layers. In addition, knit fabric 11 includes backing or lay-in yarns 25 and 26 which are held by stitch yarns 17 and 19, respectively, as shown.

In preparing the three-dimensional knit fabric of the invention, the yarn that is used is preferably a synthetic material such as polyester, acrylic or nylon. The yarn may be filament or spun, textured or fully oriented.

The yarn interconnecting the two layers of the inventive spacer fabric should have sufficient resilience and stiffness to keep the two fabric layers apart even if pressure is applied to any one of the fabric layers—in construction, the interconnecting pile yarns can be made of either the same or a different material from that of the two fabric layers. Particularly, in order to render the interconnecting pile yarns resilient, the yarns may be made of resilient material such as a monofilament or multifilament polyester or nylon.

In a preferred embodiment, both stitch yarn 19 and backing yarn 26 will either be multi- or monofilament, with high tenacity in order to increase fabric toughness. Moreover, fabric layer 13 may be sanded, brushed or napped in order to raise the fabric surface so that the fabric is soft to the foot, with each fiber end thereof being a conductor of moisture.

Figure 2:
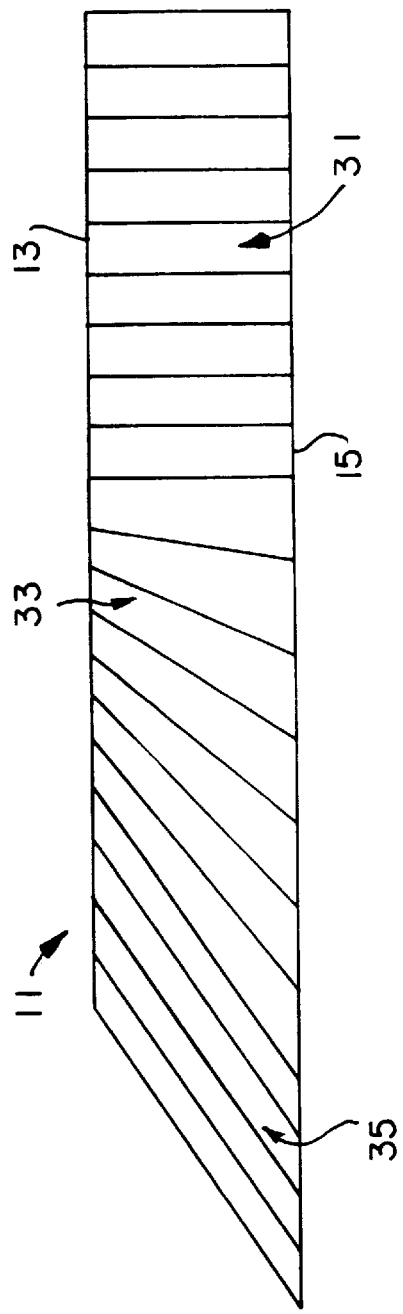
FIG. 2 is a side view of the inventive spacer fabric before inflation.

As best depicted in FIG. 2, knit fabric 11 comprises a first section 31 having a plurality of interconnecting pile yarns 21 perpendicularly disposed with respect to layers 13 and 15. Knit fabric 11 further includes a second portion 33 having a plurality of interconnecting pile yarns disposed at varying angles with respect to layers 13 and 15. Finally, knit fabric 11 also includes a third portion 35 having a plurality of interconnecting pile yarns each disposed at a fixed angle with respect to layers 13 and 15. As can be appreciated, yarns 21 of portion 30 have increasing angles with respect to layers 13 and 15 going from first portion 31 to third portion 35.

Each of portions 31, 33 and 35 includes a plurality of pile yarn courses. Significantly, the change in angle of pile yarns 21 disposed between layers 13 and 15 is achieved not in any individual knit course of the yarn, but rather between yarn courses. An impermeable membrane is placed along both layers 13 and 15 in order to enable inflation of the inventive spacer fabric.

Figure 3:
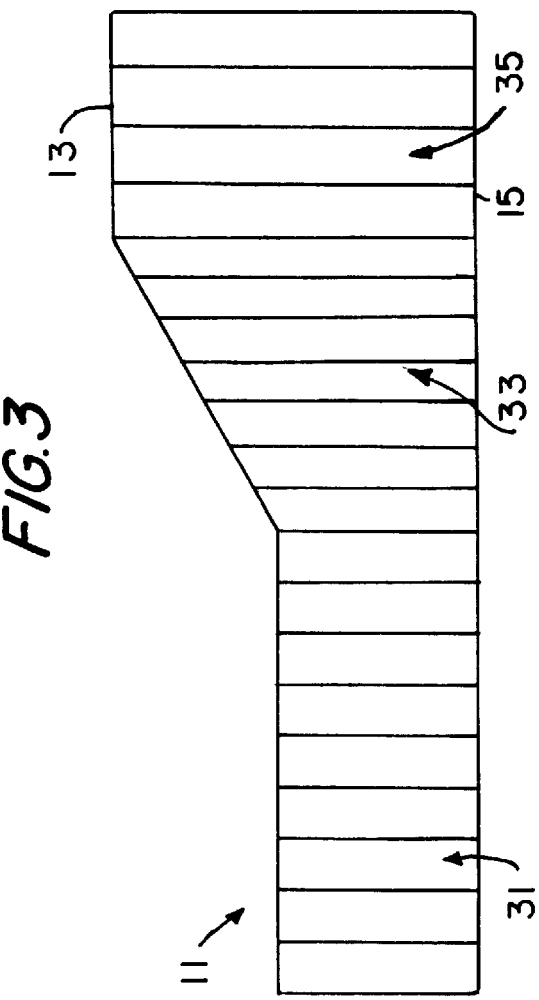
FIG. 3 is a side view of the inventive spacer fabric after inflation.

Once fabric 11 is prepared as described above, it is placed appropriately in a footwear item such as a shoe or sneaker. Then, fabric 11 is inflated to a condition best depicted in FIG. 3 by supplying pressurized air thereto by a conventional mechanism in order to achieve a desired high-low bulk spacer fabric. Accordingly, by practicing the invention, a single spacer fabric having differing heights therealong is achieved.

It will thus be seen that the objects set forth above, among those made apparent from the preceding description, are efficiently attained, and since certain changes may be made in the construction described above without departing from the spirit and scope of the invention, it is intended that all matter contained in this description shall be interpreted as illustrative and not in a limiting sense.

It is further understood that the following claims are intended to cover all of the generic and specific features of the invention, and all statements of the scope of the invention which, as a matter of language, might be said to fall therebetween.

What is claimed is:

1. An inflatable three-dimensional knit spacer fabric comprising:
   a first fabric layer, a second fabric layer and a plurality of pile yarns interconnecting said first and second layers with the spacer fabric being selectively transformable from a first uninflated condition to a second inflated condition;
   wherein said spacer fabric has a first thickness defined between said layers and includes at least a first portion in which the pile yarns thereof are perpendicularly disposed between said layers and at least a second portion adjacent said first portion in which the pile yarns thereof are disposed at an angle between said first and second fabric layers when said fabric is in said first uninflated condition;
   wherein the pile yarns of said second portion are disposed perpendicularly between said fabric layers when said fabric is in said second inflated condition such that said second portion has a second thickness defined between said layers that is greater than the said first thickness defined between said layers of said first portion.

2. The fabric layer of claim 1, wherein said pile yarns are monofilament.

3. The fabric of claim 1, wherein said pile yarns are multifilament.

4. The fabric of claim 1, wherein at least one of said first and second fabric layers includes an elastomeric yarn.

5. The fabric of claim 1, wherein said at least one of said fabric layers includes raised fibers.

6. The fabric of claim 1, wherein said second portion includes a plurality of pile yarn courses in which the yarns in at least two adjacent courses vary in angular orientation with respect to said layers.

7. The fabric of claim 1, wherein said second portion has a plurality of yarn courses in which the yarns have the same angular orientation with respect to said layers.

8. The fabric of claim 1, further including an impermeable membrane disposed along each of said fabric layers.

9. A high-low bulk knit spacer fabric, comprising:
   a first fabric portion and a second fabric portion continuous with said first fabric portion, each of said fabric portions comprising a first fabric layer, a second fabric layer and pile yarns perpendicularly interconnecting said first and second layers;
   wherein the distance between said first and second fabric layers is greater in said second portion than in said first portion, such that the thickness of the fabric increases from said first portion to said second portion.

* * * * *